US011919758B2

(12) United States Patent
Kunau

(10) Patent No.: US 11,919,758 B2
(45) Date of Patent: Mar. 5, 2024

(54) DOUBLE ACTING RAPID LIFT AUXILIARY VALVE ASSEMBLY FOR A HYDRAULIC JACK

(71) Applicant: Gaither Tool Company, Inc., Jacksonville, IL (US)

(72) Inventor: Daniel Kunau, Boone, CO (US)

(73) Assignee: Gaither Tool Company, Inc., Jacksonville, IL (US)

( * ) Notice: Subject to any disclaimer, the term of this patent is extended or adjusted under 35 U.S.C. 154(b) by 0 days.

(21) Appl. No.: 17/824,870

(22) Filed: May 25, 2022

(65) Prior Publication Data

US 2023/0009283 A1 Jan. 12, 2023

Related U.S. Application Data

(60) Provisional application No. 63/192,737, filed on May 25, 2021.

(51) Int. Cl.
*B66F 3/42* (2006.01)

(52) U.S. Cl.
CPC .................................... *B66F 3/42* (2013.01)

(58) Field of Classification Search
CPC .................................... B66F 3/42; F15B 7/04
USPC .......................................... 60/477, 479, 486
See application file for complete search history.

(56) References Cited

U.S. PATENT DOCUMENTS 4,144,713 A * 3/1979 Clark .................. A61G 7/1017 60/482
5,975,496 A * 11/1999 Hong ........................ B66F 3/42 60/486
6,035,635 A 3/2000 Hung
6,572,080 B1 6/2003 Delikatzis
6,722,634 B1 4/2004 Hsu
7,637,479 B2 12/2009 Lautzenhiser
10,654,696 B2 5/2020 Wu

FOREIGN PATENT DOCUMENTS

CN 2172760 Y * 7/1994

OTHER PUBLICATIONS

CN2172760Y Publication Jul. 27, 1994 retrieved translation from Espacenet: https://translationportal.epo.org/emtp/translate/?ACTION=description-retrieval&COUNTRY=CN&ENGINE=google&FORMAT=docdb&KIND=Y&LOCALE=en_EP&NUMBER=2172760&SRCLANG=zh&TRGLANG=en (Year: 1994).*

* cited by examiner

*Primary Examiner* — Don M Anderson
*Assistant Examiner* — Christopher Soto
(74) *Attorney, Agent, or Firm* — ROBINSON & COLE LLP

(57) ABSTRACT

A double action hydraulic jack has a primary hydraulic pump in fluidic communication with the hydraulic fluid reservoir and with the lift cylinder. The hydraulic jack has an auxiliary hydraulic pump also in fluidic communication with the hydraulic fluid reservoir and the lift cylinder. The auxiliary hydraulic pump operates at light-load conditions to drive the jack ram upwards at a rate at least three times faster than at heavy lift-load conditions with only the primary hydraulic pump in operation.

12 Claims, 2 Drawing Sheets

DOUBLE ACTING RAPID LIFT AUXILIARY VALVE ASSEMBLY FOR A HYDRAULIC JACK

CROSS-REFERENCE TO RELATED APPLICATIONS

The present application claims priority from, and incorporates by reference in its entirety, U.S. patent provisional patent application Ser. No. 63/192,737 filed May 25, 2022.

TECHNICAL FIELD

Various embodiments of the present invention relate to lifting tools, and more specifically, to hydraulic jacks.

BACKGROUND

Hydraulic jacks are used in auto repair shops, farms, manufacturing facilities and construction sites. When using a hydraulic jack to raise a heavy item it often takes longer to position the jack and raise the ram up to the item being lifted than it does to actually jack the heavy item to the desired height.

BRIEF SUMMARY

The present inventor recognized a need for a hydraulic jack that raises quickly under light-load conditions, and then automatically shifts to a normal lifting rate and torque under lift-load conditions. The various embodiments achieve this objective, as discussed in the paragraphs below and illustrated in the drawings.

According to various embodiments disclosed herein a hydraulic jack includes a base unit with a flat lower surface configured to sit on a floor and a lift cylinder with a proximal end and a distal end. The proximal end is rigidly connected to the base unit. The lift cylinder of the hydraulic jack has a ram which is configured to fit within the lift cylinder and slide back and forth in and out of the distal end of the lift cylinder. The hydraulic jack also has a hydraulic fluid reservoir that is rigidly connected to the base unit and contains hydraulic fluid. A primary hydraulic pump is in fluidic communication with the hydraulic fluid reservoir, and is also in fluidic communication with the lift cylinder. An auxiliary hydraulic pump is in fluidic communication with the hydraulic fluid reservoir, and is also in fluidic communication with the lift cylinder as well. The auxiliary hydraulic pump causes the hydraulic fluid to be pumped to the lift cylinder at load weights of less than a load-condition shift weight for the hydraulic jack, and the auxiliary hydraulic pump does not pump the hydraulic fluid to the lift cylinder upon the load weights being greater than the load-condition shift weight for the hydraulic jack.

DESCRIPTION OF THE DRAWINGS

The accompanying drawings, which are incorporated in and constitute part of the specification, illustrate various embodiments of the invention. Together with the general description, the drawings serve to explain the principles of the invention. In the drawings.

DETAILED DESCRIPTION

Figure 1:
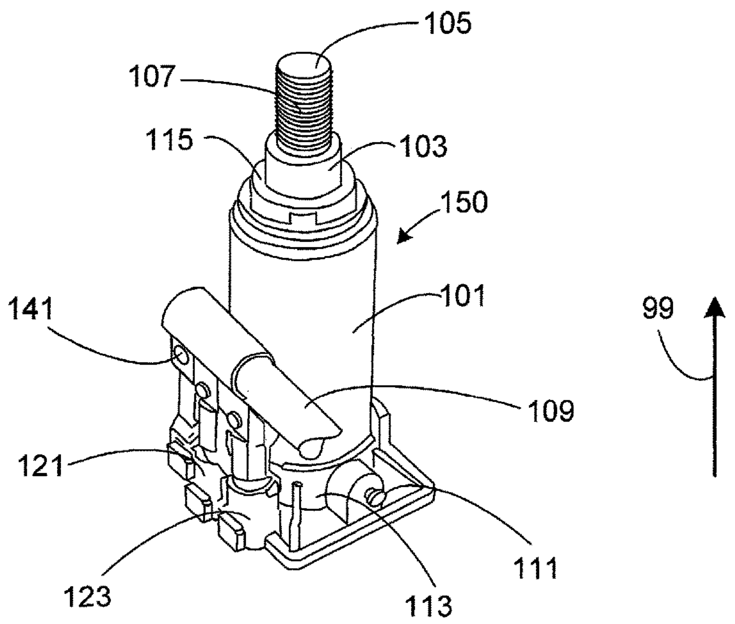
FIG. 1 is an oblique view of a double acting rapid lift auxiliary valve hydraulic jack, according to various embodiments.

FIG. 1 is an oblique view of a hydraulic jack with a double acting rapid lift auxiliary valve, according to various embodiments. The hydraulic jack 150 has a metal casing 101 attached to a base 113. The metal casing 101 is sometimes called a jack body 101. A lift cylinder 115 contained within the metal casing 101 has its proximal end attached to base 113. In some implementations the proximal end of lift cylinder 115 may be attached to base 113 via the metal casing 101. The hydraulic jack 150 has a ram 103 extending from the lift cylinder 115. The ram 103 can by hydraulically powered to extend in an upward direction 99 from the distal (upper) end of lift cylinder 115 to lift a load weight. In this way the hydraulic jack 150 can lift heavy objects. Typically, the ram 103 has an extension screw 107 that can be adjusted upward (i.e., screwed out) prior to lifting the heavy object. The extension screw 107 has a jack rod top cap 105. The top cap 105 is the part that comes in contact with the heavy object to be lifted. (Top cap 105 is sometimes called a saddle.)

The hydraulic jack 150 has a handle 109 that can be manipulated (e.g., pumped up and down) to operate the hydraulic jack 150 for lifting heavy objects. Handle 109 rotates about jack handle rotation point 141. The hydraulic jack 150 has a release valve 111 that, upon being opened, releases hydraulic fluid 139 from lift cylinder 115 via the lift cylinder return line 147 back into the hydraulic fluid reservoir 129 (sometimes called an oil sump 129) to lower the ram 103. The hydraulic jack 150 has a base 113 that supports the hydraulic jack 150. The base unit typically has a flat lower surface configured to sit on a floor. Depending upon the particular configuration, the base 113 may have various other components attached to it, or configured within it. The base 113 typically contains some of the connections between the inner components shown in FIG. 2 and described below. Finally, the hydraulic jack 150 has a primary pump 121 and an auxiliary pump 123 (which may also be called primary cylinder 121 and an auxiliary cylinder 123).

Figure 2:
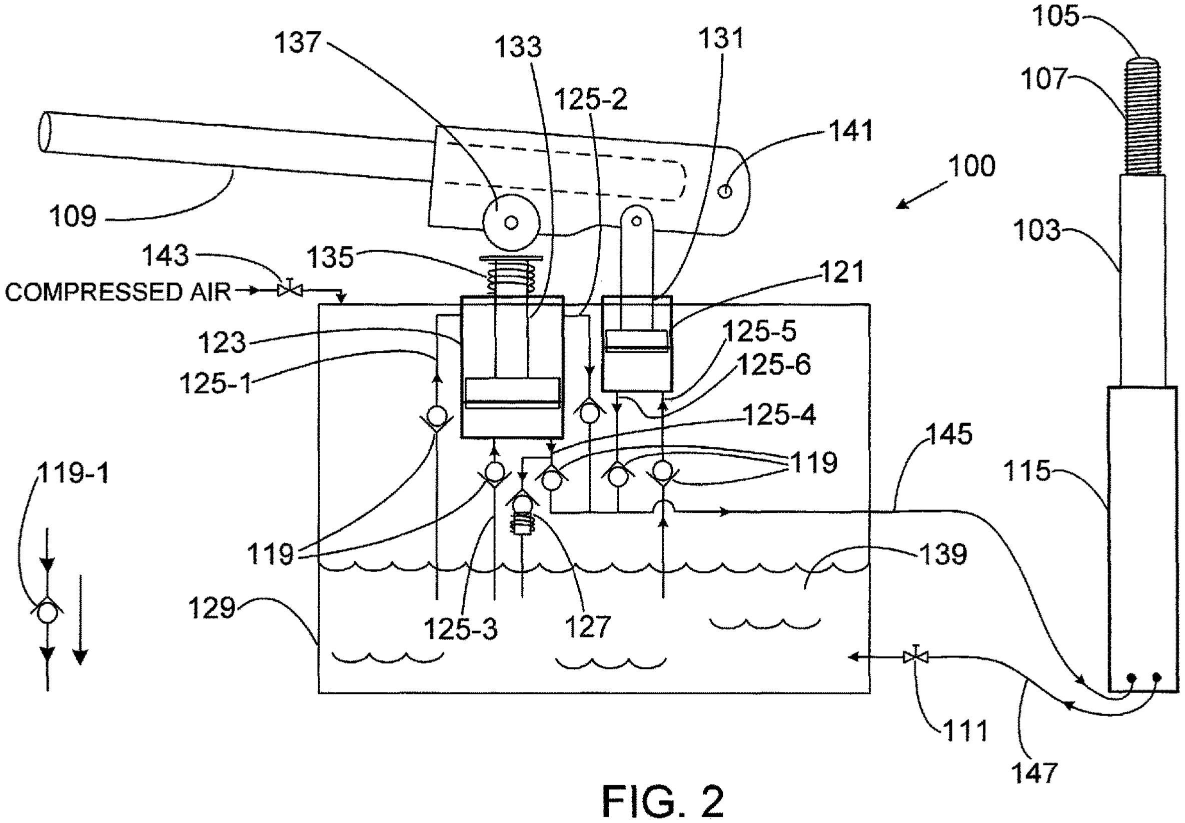
FIG. 2 is a cut-away side view of a double acting rapid lift auxiliary valve assembly for a hydraulic jack, according to various embodiments.

FIG. 2 is a cut-away side view of a double acting rapid lift auxiliary valve assembly 100 for hydraulic jack 150, according to various embodiments. FIG. 2 illustrates the various inner components of hydraulic jack 150 shown in FIG. 1 that make up the double acting rapid lift auxiliary valve assembly. These inner components include a number of one-way valves 119 (sometimes called check valves), a primary pump 121, an auxiliary pump 123, a relief valve 127, a hydraulic fluid reservoir 129, a primary piston 131, an auxiliary piston 133, a spring 135, and an auxiliary push component 137. One-way valve 119-1, shown apart from the auxiliary valve assembly 100 in FIG. 2, is a typical example of the one-way valves 119 provided to illustrate the direction of fluid flow through the valve. The one-way valve 119-1 is said to be oriented to provide flow in the direction of the arrow. It should be noted that level of hydraulic fluid 139 varies depending upon the height to which the ram 103 is extended. The level of hydraulic fluid 139 is at its highest with the ram 103 down to its minimal level—a fluid level of approximately 75% the total capacity of the maximum capacity of hydraulic fluid reservoir 129. The level of hydraulic fluid 139 is at its lowest level with the ram 103 fully extended as high as it will go.

FIG. 2 also depicts handle 109 which is positioned on the outside of hydraulic jack 150 and configured to rotate about jack handle rotation point 141. The handle 109 is not attached to auxiliary piston 133, but is rotatably attached to primary piston 131. Handle 109 has auxiliary push component 137 attached to it and configured to push down on the top of the piston rod of auxiliary piston 133 (without being attached). The auxiliary pump 123 continues pumping so long as compression spring 135 is able to push the auxiliary piston 133 back up as the handle 109 is raised.

In typical embodiments the auxiliary pump 123 is positioned further away from jack handle rotation point 141 than the primary pump 121. In this configuration the primary pump 121 has more leverage by virtue of its shorter stroke length, and auxiliary pump 123 takes a longer stroke by virtue of being further away from the handle rotation point 141. For a given amount of handle 109 rotation about rotation point 141, the stroke length of the auxiliary pump 123 is at least 10% longer than the stroke length of primary pump 121. In some embodiments the auxiliary pump 123 is at least 20% longer than the stroke length of primary pump 121. This aids in making the auxiliary pump 123 pump a greater volume of hydraulic fluid 139, while the lower volume primary pump 121 has more leverage for lifting heavier load weights. It should also be noted that in typical implementations a larger diameter cylinder is used for the auxiliary pump 123 than the cylinder of the primary pump 121. This is another characteristic that tends to allow the auxiliary pump 123 to pump larger volumes while affording the primary pump 121 greater leverage. In various embodiments the cylinder of the auxiliary pump 123 has a diameter at least 15% greater than that of the primary pump 121. In other embodiments the auxiliary pump 123 has a diameter at least 20% greater than that of the primary pump 121, while in yet other embodiments it is at least 25% greater.

The greater cylinder volume and longer stroke length of auxiliary pump 123 as compared to primary pump 121 causes the ram 103 to elevate at a much greater rate during light-load conditions than it elevates under lift-load conditions with only the primary pump 121. In various embodiments the light-load ram elevation rate is at least 100% greater than the lift-load ram elevation rate. In other embodiments the light-load ram elevation rate is at least 150% greater than the lift-load ram elevation rate, while in yet other embodiments the light-load ram elevation rate is at least 200% greater than the lift-load ram elevation rate. In some embodiments the light-load ram elevation rate is at least 300% greater than the lift-load ram elevation rate.

The various inner components may be arranged in a number of ways relative to each other, depending upon the requirements of the implementation. For example, in some implementations the primary pump 121 and the auxiliary pump 123 may be positioned within hydraulic fluid reservoir 129. In other implementations the primary and auxiliary pumps 121-123 may be formed partially outside the hydraulic fluid reservoir 129 and extend through its surface to the inside of hydraulic fluid reservoir 129. In yet other embodiments the primary and auxiliary pumps 121-123 may be positioned completely outside of hydraulic fluid reservoir 129 with hydraulic lines extending into it. In another example of varying configurations, the hydraulic fluid reservoir 129 is at least connected to the base 113. The hydraulic fluid reservoir 129 may be fully or partially formed from the base 113, or may be a separate component connected to the base 113. (A hydraulic fluid reservoir 129 either fully or partially formed from the base 113 is also said to be connected to the base 113.)

The primary pump 121 operates under both light-load conditions and lift-load conditions. Operation under lift-load conditions may be referred to as a "heavy load conditions." Operation under light-load conditions may sometimes be referred to as a "no-load conditions." "Light-load" conditions may be a more appropriate term than "no-load" conditions since the user sometimes places custom shaped removable jack saddle on top cap 105 of ram 103 (or sometimes places a small piece of wood on top cap 105) to better fit on the vehicle or other load being lifted. This adds a small bit of weight to the load weight being lifted by the hydraulic jack 150.

A typical light-load condition occurs when the hydraulic jack 150 is initially placed in position to lift a heavy item and the user manipulates the jack handle to raise the jack ram up to the item to be lifted. That is, it operates with each stroke under the light-load condition as the top cap of the jack is being pumped up towards a lift load such as a truck, car, or other vehicle, and it continues operating as the top cap reaches the vehicle and the jack transitions to a lift-load condition. The weight on the top cap at which the hydraulic jack 150 transitions to from a light-load condition to a lift-load condition is referred to the "load-condition shift weight". The design parameters of hydraulic jack 150 can be altered to vary the load-condition shift weight to a desired amount, e.g., selecting the characteristics of the relief valve 127. The load-condition shift weight is largely determined by the hydraulic pressure at which the relief valve 127 begins passing hydraulic fluid 139, and is affected by the internal fluid friction of the hydraulic lines.

A typical load-condition shift weight may be around 75 pounds, but could be as high as 400 pounds for some implementations, or as low as 5 pounds in other implementations. In various implementations the load-condition shift weight falls within the range of at least 10 pounds but not greater than 300 pounds. In other implementations the load-condition shift weight falls within the range of at least 15 pounds but not greater than 200 pounds. In yet other implementations the load-condition shift weight falls within the range of at least 15 pounds but not greater than 200 pounds. In some implementations the load-condition shift weight falls within the range of at least 15 pounds but not greater than 150 pounds. In some implementations the load-condition shift weight is defined as being at least 15 pounds, in other implementations the load-condition shift weight is defined as being at least 20 pounds, and in yet other implementations the load-condition shift weight is defined as being at least 25 pounds. In some implementations the load-condition shift weight is defined as being no greater than 150 pounds, in other implementations the load-condition shift weight is defined as being no greater than 75 pounds, and in yet other implementations the load-condition shift weight is defined as being no greater than 50 pounds.

During each upstroke of handle 109 the one-way valve 119 on hydraulic line 125-5 is open and the one-way valve 119 on hydraulic line 125-6 is closed. On each upstroke of handle 109 hydraulic line 125-5 carries hydraulic fluid 139 into primary pump 121 from the hydraulic fluid reservoir 129. During each downstroke of handle 109 the one-way valve 119 on hydraulic line 125-5 is closed and the one-way valve 119 on hydraulic line 125-6 is open. On each downstroke of handle 109 hydraulic line 125-6 carries hydraulic fluid 139 out of primary pump 121 to the lift cylinder 115 via lift cylinder supply line 145. This allows hydraulic fluid to be pulled up into the primary pump cylinder 121 on each upstroke, and then pushed by the primary pump 121 out to the lift cylinder 115 on each down stroke. As such the primary pump 121 is a single action pump.

The auxiliary pump 123 is a double action pump that operates so long as there is a light-load condition on the hydraulic jack 150, e.g., until the top cap 105 of ram 103 reaches the heavy item to be lifted (e.g., truck or car) and load weight on ram 103 exceeds the load-condition shift weight. The auxiliary pump 123 does not operate under lift-load conditions. As hydraulic jack 150 begins to push greater load weights upward, the fluid pressure and air pressure within hydraulic fluid reservoir 129 increases. Upon reaching a load-condition shift weight on the hydraulic jack 150, the pressure in the hydraulic fluid reservoir 129 becomes such that the upward force of spring 135 cannot overcome the downward force of the hydraulic fluid 139 in the top section of auxiliary pump 123, and the auxiliary piston 133 stays on the bottom of auxiliary pump 123 while the handle 109 continues to be pumped.

So long as the load-condition shift weight has not been reached each upstroke of handle 109 causes the hydraulic line 125-1 to carry hydraulic fluid 139 from the hydraulic fluid reservoir 129 into the upper portion of auxiliary pump 123 (above auxiliary piston 133). With each downstroke of handle 109 hydraulic line 125-2 carries hydraulic fluid 139 from the upper portion of auxiliary pump 123 to lift cylinder 115—so long as the load-condition shift weight has not been reached. The lower portion of auxiliary pump 123 operates in a similar manner to the primary pump 121—so long as the load-condition shift weight has not been reached. Each upstroke of handle 109 causes hydraulic line 125-3 to carry hydraulic fluid 139 from the hydraulic fluid reservoir 129 into the lower portion of auxiliary pump 123. Each downstroke of handle 109 causes hydraulic line 125-4 to carry hydraulic fluid 139 from the lower portion of auxiliary pump 123 to lift cylinder 115 via lift cylinder supply line 145. In this way, auxiliary pump 123 pumps a great deal of hydraulic fluid 139 since auxiliary pump 123 is a double action pump that pumps in both the upstroke and also the downstroke so long as the load-condition shift weight has not been reached.

With each upstroke of the auxiliary pump 123 under light-load conditions the spring 135 pushes the auxiliary piston 133 back upward, pumping fluid out of the upper portion of the auxiliary pump 123 through hydraulic lines 125-2 and to the lift cylinder 115 while the relief valve 127 remains closed. This happens with each stroke until the downward force in the top portion of the auxiliary pump 123 from the lift cylinder 115 hydraulic line pressure surpasses the upward force of the spring 135. In other words, when the jack rod top cap 105 reaches the vehicle and a lift load is placed on the hydraulic jack 150 the pressure in the hydraulic line to the lift cylinder 115 becomes much greater. This causes the one-way valves 119 in the outgoing line from the lower portion of the auxiliary cylinder to remain closed on the downward stroke while the relief valve 127 opens, dumping the contents of the lower auxiliary cylinder back into the hydraulic fluid reservoir 129. On the upward stroke the upward force is insufficient to push the piston back up again. This pins the auxiliary piston 133 against the floor of the auxiliary pump 123, preventing the auxiliary pump 123 from operating under lift-load conditions upon exceeding the load-condition shift weight. The smaller primary pump 121 with greater leverage continues to operate, thus providing lift under lift-load conditions. It may be noted that there is also an upward force due to the sump pressure which may be disregarded when the sump pressure is at atmospheric pressure. Thus, the upward force would actually be the force of the spring plus the upward force in the bottom portion of the auxiliary pump cylinder due to the fluid reservoir pressure.

FIG. 2 depicts a source of compressed air routed into the hydraulic fluid reservoir 129 via an air valve 143. Some embodiments may use the source of compressed air to raise the ram 103 up to the point of the lift load. The compressed air rapidly acts to raise ram 103. Such embodiments may be implemented in a hydraulic jack that does not have an auxiliary pump 133.

Figure 3:
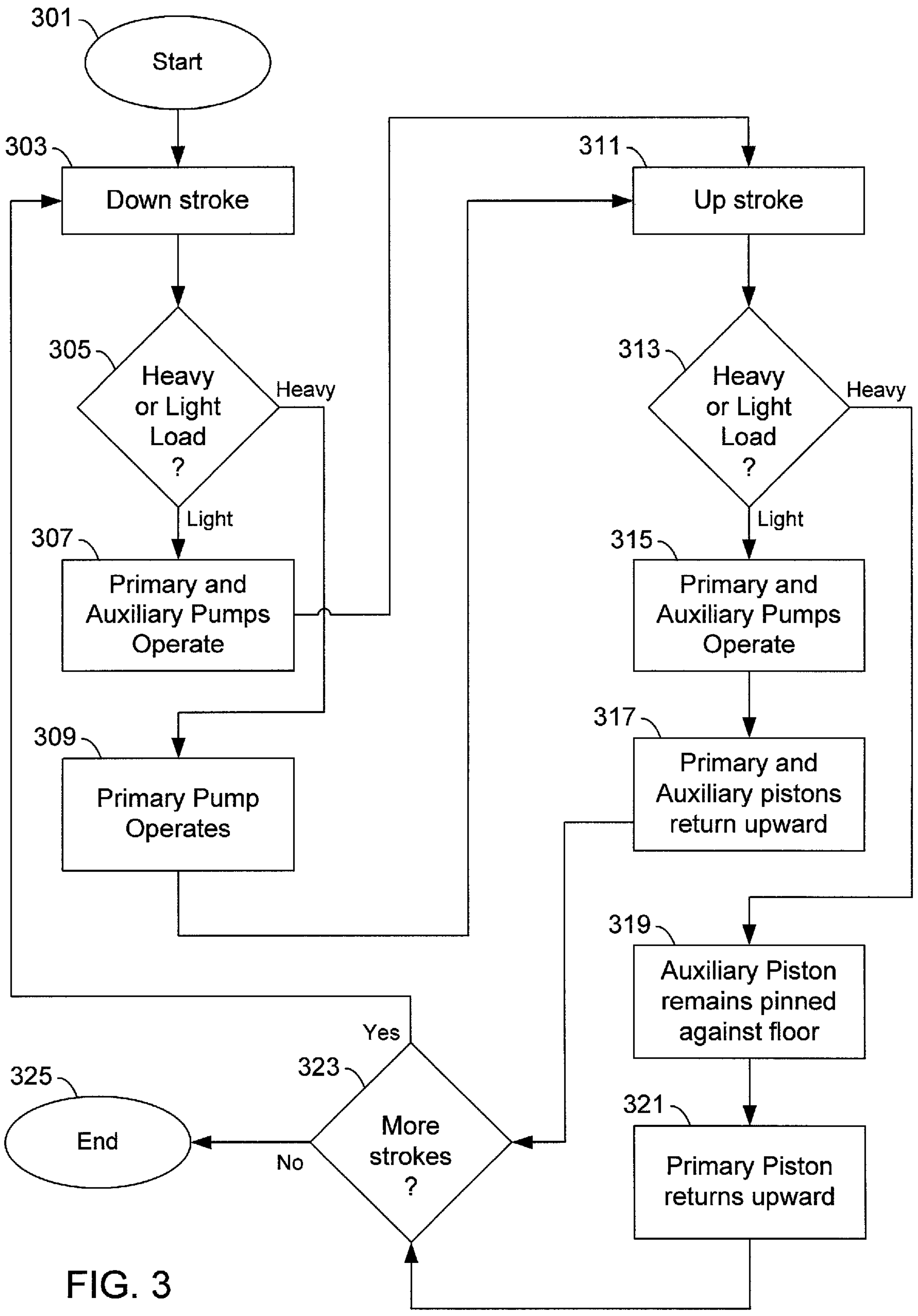
FIG. 3 is a flowchart depicting operational activities of a double acting rapid lift auxiliary valve assembly for a hydraulic jack, according to various embodiments.

FIG. 3 is a flowchart depicting operational activities, according to various embodiments. The method begins at block 301 with no load (or a very light load) on the jack ram 103, and proceeds to block 303 where the user makes a down stroke on the hydraulic jack handle 109. The method proceeds from block 303 to block 305 where it is determined whether there is a heavy load causing a lift-load condition or a light load resulting in continued light-load condition. If it is determined in block 305 that a light-load condition exists the method proceeds along the LIGHT path to block 307. In block 307 both the primary and auxiliary pumps operate as the user continues with the down-stroke. This raises the jack ram 103 at a relatively fast rate. The method proceeds from block 307 to block 311.

Back in block 305 if it is determined that a lift-load condition the method proceeds along the HEAVY path to block 309. In block 309 only the primary pump operates as the user continues with the down-stroke. This raises the jack ram 103 at a slower rate, but provides more leverage for lifting heavy loads. The method proceeds from block 309 to block 311.

In block 311 the user makes an up-stroke on the hydraulic jack handle 109. The method proceeds from block 311 to block 313 where it is determined for the up-stroke whether there is a heavy load causing a lift-load condition or a light load resulting in continued light-load condition. If it is determined in block 313 that a light-load condition continues to exist the method proceeds along the LIGHT path to block 315. In block 315 both the primary and auxiliary pumps operate as the user continues with the up-stroke. The method proceeds to block 317, and since a light-load condition exists the spring 135 has sufficient force to raise the handle 109 on the up-stroke. The jack ram 103 continues to elevate at a relatively fast rate with both the primary and auxiliary pumps operating. The method proceeds from block 317 to block 323.

Back in block 313 if it is determined that a lift-load condition the method proceeds along the HEAVY path from block 313 to block 319. In block 319 as the user continues with the up-stroke the auxiliary piston 133 remains pinned against the floor of auxiliary pump 123. Only the primary pump 121 continues to operate since the spring 135 cannot raise the piston 133. Further, during the immediately previous down-stroke the relief valve 127 most likely drained the contents of the lower portion of auxiliary pump 123 back into hydraulic fluid reservoir 129, depending upon the fluid pressure in auxiliary pump 123 as compared to the fluid pressure in lift cylinder supply line 145. The method proceeds from 319 to bock 321 and the primary piston 131 raises as the user continues with the up-stroke.

The method proceeds from block 321 to block 323 where it is determined whether the hydraulic jack 150 is to be raised higher. To continue with more strokes the method proceeds along the YES path back to block 303 to begin the stroke process again. If it is determined in block 323 that no further strokes are required, the method proceeds along the NO path to block 325 and ends.

The upward direction 99 runs outward from the center of the earth through the earth's surface. The downward direction is opposite upward direction 99. For ease of explanation and illustration of the various embodiments, the hydraulic jack 150 is shown and described as being oriented in an upright position—that is, with the ram 103 extending in the upward direction 99. This allows the hydraulic fluid 139 to flow towards the bottom of the hydraulic fluid reservoir 129. As a practical matter, the hydraulic jack 150 can be used at angles other than pointing in the upward direction 99. Typically, the hydraulic jack 150 can be tilted somewhat, so long as the various hydraulic lines 125-1 through 125-6 extend down into the hydraulic fluid. Further, the primary pump 121 and auxiliary pump 123 can be oriented in various directions to allow the handle to be pointed in a desired direction. For example, orienting the primary pump 121 and auxiliary pump 123 in a horizontal direction (rather than vertically oriented as shown in FIG. 2) allows the handle to point more or less upward. In such an implementation the various hydraulic lines would simply run from the horizontally positioned primary pump 121 and auxiliary pump 123 into the hydraulic fluid 139 within the hydraulic fluid reservoir 129.

The one-way valves 119 discussed throughout this disclosure may be spring type check valves, gravity type check valves, swing type check valves or any other type of check valve that allows fluid flow in one direct and prevents fluid flow in the other direction as are known by those of ordinary skill in the art. The base unit typically has a "flat" lower surface configured to sit on a floor. The flat surface need not be smooth. It may be textured or have treads to avoid slippage. It is "flat" inasmuch as it is configured to sit on a smooth, flat surface (e.g., a concrete floor) in a stable manner without rocking back and forth.

The term "hydraulic fluid" has been used herein to describe the fluid in a hydraulic jack. Hydraulic fluid may actually be an oil product, or may be any sort of synthetic or naturally occurring liquids, or other types of fluids suitable for use in a hydraulic jack as are known by those of ordinary skill in the art. The auxiliary pump 123 is described herein as a double action pump that operates to pump hydraulic fluid on both the downstroke and the upstroke. In some embodiments, however, the auxiliary pump 123 may be implemented as a single action pump that pumps hydraulic fluid either on only the down stroke or on only the upstroke. In such single action pump implementations either the hydraulic lines 125-1/2 are omitted for a downstroke single action pump, or the hydraulic lines 125-3/4 are omitted for an upstroke single action pump. Spring 135 is shown and described as a compression spring for the purposes of illustration. In practice, a number of elastic components can be used for the spring 135. The elastic component may be embodied as a piece of spring steel, a piece of rubber, a rubber band, an elastic band, a leaf spring or any type of elastic component known by those of ordinary skill in the art to have elasticity sufficient to push the auxiliary piston 133 upwards on the handle 109 upstroke under light-load conditions.

Two components that are in "fluidic communication" with each other, as this phrase is used herein, means that fluid (e.g., hydraulic fluid or pressurized air) passes between the two components. The phrase "fluidically connected" means the same as "in fluidic communication." More than two components can be "in fluidic communication" (or be fluidically connected). For example, the hydraulic fluid line to lift cylinder 115 is in fluidic communication with the primary pump 121 and with the top and bottom sections of auxiliary pump 132. The phrase "pneumatically connected" is similar to fluidically connected, except "pneumatically" generally implies a gaseous material (e.g., air) rather than a liquid. The "fluid" in a fluidic connection could be either a liquid or a gas. A first component connected "via a second component" to a third component means that the second component is in the connection path between the first and the third components. For example, the bottom section of auxiliary pump 123 is fluidically connected by hydraulic line 125-4 to the hydraulic fluid reservoir 129 via relief valve 127.

The phrase "rotatably connected" or "rotatably attached" means that two parts are connected in a manner that allows them to rotate to at least some extend (i.e., at least 10 degrees) relative to each other. For example, a door is rotatably connected to a door frame by two or more hinges. The phrase "rigidly connected" means that two components are connected together in a manner that prevents relative movement between the two parts. Two parts welded together are rigidly connected. Two parts that are bolted together in at least two non-parallel planes are rigidly connected to each other. A component that "slidably fits" within another component fits into a hole or depression in the other component in a manner that allows it to slide back and forth. For example, a sword slidably fits into its scabbard. The "load weight" is the amount of weight being lifted by ram 103.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises," "comprising," "includes," and/or "including" used in this specification specify the presence of stated features, integers, steps, operations, elements, and/or components, but do not preclude the presence or addition of one or more other features, integers, steps, operations, elements, components, and/or groups thereof. The term "plurality", as used herein and in the claims, means two or more of a named element. It should not, however, be interpreted to necessarily refer to every instance of the named element in the entire device. Particularly, if there is a reference to "each" element of a "plurality" of elements. There may be additional elements in the entire device that are not be included in the "plurality" and are not, therefore, referred to by "each."

The description of the various embodiments provided above is illustrative in nature inasmuch as it is not intended to limit the invention, its application, or uses. Thus, variations that do not depart from the intents or purposes of the invention are intended to be encompassed by the various embodiments of the present invention. Such variations are not to be regarded as a departure from the intended scope of the present invention.

What is claimed is:

1. A hydraulic jack comprising:

a base unit with a flat lower surface configured to sit on a floor;

a lift cylinder comprising a proximal end and a distal end, the proximal end being rigidly connected to the base unit;

a ram included as part of the lift cylinder, at least a portion of the ram being configured to fit within the lift cylinder and slide back and forth in and out of the distal end of the lift cylinder;

a handle rotatably attached to the base unit at a jack handle rotation point;

a hydraulic fluid reservoir connected to the base unit and containing hydraulic fluid;

a primary hydraulic pump in fluidic communication with the hydraulic fluid reservoir, and being in fluidic communication with the lift cylinder;

a primary piston rotatably attached to the handle at a piston rotation point and being configured to slidably fit within the primary hydraulic pump;

an auxiliary hydraulic pump in fluidic communication with the hydraulic fluid reservoir, and being in fluidic communication with the lift cylinder; and an auxiliary piston configured to come in contact with the handle and slidably fit within the auxiliary hydraulic pump;

wherein the auxiliary piston comes into contact with the handle at a point further from the jack handle rotation point than a distance between the piston rotation point and the jack handle rotation point;

wherein the auxiliary hydraulic pump causes the hydraulic fluid to be pumped to the lift cylinder at load weights of less than a load-condition shift weight for the hydraulic jack; and wherein the auxiliary hydraulic pump does not pump the hydraulic fluid to the lift cylinder upon the load weights being greater than the load-condition shift weight for the hydraulic jack.

2. The hydraulic jack of claim 1, wherein the ram elevates at a ram elevation rate in response to the handle being pumped up and down;

wherein at load weights of less than the load-condition shift weight the ram elevates at a light-load ram elevation rate, and upon the load weights being greater than the load-condition shift weight the ram elevates at a lift-load ram elevation rate;

wherein the light-load ram elevation rate is at least 100% greater than the lift-load ram elevation rate.

3. The hydraulic jack of claim 2, wherein the light-load ram elevation rate is at least 200% greater than the lift-load ram elevation rate.

4. The hydraulic jack of claim 1, wherein the auxiliary piston has a diameter at least 20% greater than a diameter of the primary piston.

5. The hydraulic jack of claim 4, further comprising:

a lift cylinder supply line in fluidic communication with the lift cylinder;

wherein the primary hydraulic pump is in fluidic communication with the hydraulic fluid reservoir via a first one-way valve oriented to provide flow from the hydraulic fluid reservoir, the primary hydraulic pump being in fluidic communication with the lift cylinder via a second one-way valve oriented to provide flow towards the lift cylinder via the lift cylinder supply line.

6. The hydraulic jack of claim 5, wherein the auxiliary hydraulic pump is in fluidic communication with the hydraulic fluid reservoir via a third one-way valve oriented to provide flow from the hydraulic fluid reservoir, the auxiliary hydraulic pump being in fluidic communication with the lift cylinder via a fourth one-way valve oriented to provide flow towards the lift cylinder via the lift cylinder supply line.

7. The hydraulic jack of claim 6, wherein an upper portion of the auxiliary hydraulic pump is in fluidic communication with the hydraulic fluid reservoir via the third one-way valve oriented to provide flow from the hydraulic fluid reservoir, and the upper portion of the auxiliary hydraulic pump is in fluidic communication with the lift cylinder via the fourth one-way valve oriented to provide flow towards the lift cylinder via the lift cylinder supply line.

8. The hydraulic jack of claim 7, wherein a lower portion of the auxiliary hydraulic pump is in fluidic communication with the hydraulic fluid reservoir via a fifth one-way valve oriented to provide flow from the hydraulic fluid reservoir, and the lower portion of the auxiliary hydraulic pump is in fluidic communication with the lift cylinder via a sixth one-way valve oriented to provide flow towards the lift cylinder via the lift cylinder supply line.

9. The hydraulic jack of claim 8, wherein the lower portion of the auxiliary hydraulic pump is in fluidic communication with the hydraulic fluid reservoir via a relief valve oriented to provide flow from the lower portion of the auxiliary hydraulic pump to the hydraulic fluid reservoir upon the load weights being greater than the load-condition shift weight for the hydraulic jack.

10. The hydraulic jack of claim 1, wherein the auxiliary piston has an auxiliary stroke length at least 20% longer than a primary stroke length of the primary piston.

11. The hydraulic jack of claim 1, wherein upon the load weight being less than the load-condition shift weight the auxiliary hydraulic pump is a double action pump that elevates the ram in response to the handle being pumped up and also elevates the ram in response to the handle being pumped down.

12. The hydraulic jack of claim 1, further comprising:

an auxiliary cylinder of the auxiliary hydraulic pump, the auxiliary cylinder including a cylinder floor;

wherein upon the load weight being greater than the load-condition shift weight the auxiliary hydraulic pump remains pinned against the cylinder floor and does not pump the hydraulic fluid to the lift cylinder.

* * * * *